US006584392B1

(12) United States Patent
Jankovic et al.

(10) Patent No.: US 6,584,392 B1
(45) Date of Patent: Jun. 24, 2003

(54) POWERTRAIN OUTPUT MONITOR

(75) Inventors: Mrdjan J. Jankovic, Birmingham, MI (US); Stephen William Magner, Lincoln Park, MI (US); Tobias John Pallett, Ypsilanti, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 346 days.

(21) Appl. No.: 09/597,011

(22) Filed: Jun. 20, 2000

(51) Int. Cl.[7] ............................ G06F 17/00; F02D 7/00

(52) U.S. Cl. .......................... 701/54; 123/399; 123/478

(58) Field of Search ..................... 701/54, 56; 123/683, 123/436, 399, 361, 478, 480; 477/115, 64, 107

(56) References Cited

U.S. PATENT DOCUMENTS

| | | | | |
|---|---|---|---|---|
| 5,048,491 A | | 9/1991 | Haiki | |
| 5,204,816 A | | 4/1993 | Wright et al. | |
| 5,673,668 A | | 10/1997 | Pallett et al. | |
| 5,692,472 A | | 12/1997 | Bederna et al. | |
| 5,755,201 A | | 5/1998 | Knoss et al. | |
| 5,904,131 A | * | 5/1999 | O'Neill et al. | 123/683 |
| 6,006,724 A | * | 12/1999 | Takahashi et al. | 123/339.19 |
| 6,014,604 A | * | 1/2000 | Kuroiwa et al. | 701/54 |
| 6,073,610 A | * | 6/2000 | Matsumoto et al. | 123/396 |
| 6,085,717 A | * | 7/2000 | Kamura et al. | 123/295 |
| 6,178,371 B1 | * | 1/2001 | Light et al. | 701/93 |
| 6,188,943 B1 | * | 2/2001 | Uchida et al. | 701/54 |

* cited by examiner

*Primary Examiner*—Willis R. Wolfe
*Assistant Examiner*—Mahmoud Gimie
(74) *Attorney, Agent, or Firm*—Allan J. Lippa

(57) ABSTRACT

A method of controlling the power output of an internal combustion engine having at least one fuel injector responsive to a commanded fuel signal. The method includes the steps of determining a desired engine power, and determining a first fuel flow value as a function of the desired engine power and engine speed. This first fuel flow value is then compared to the desired fuel flow signal generated by the air-fuel ratio controller. The commanded fuel signal is then limited by the lesser of the desired fuel flow and first fuel flow value. In one aspect of the invention, the desired engine power is calculated by determining a first power value as a function of engine speed and a desired engine torque, and determining a second power value as a function of turbine speed, driveline efficiency and a desired wheel power. The desired engine power is then selected as the lesser of the first and second power values. In another aspect of the invention, the first fuel flow value is modulated by a static and dynamic fault tolerance margin to prevent fuel limiting during normal engine operation.

15 Claims, 4 Drawing Sheets

POWERTRAIN OUTPUT MONITOR

TECHNICAL FIELD

The present invention is directed to a control system and method for internal combustion engines, and more particularly, concerns a powertrain output monitor for electronic throttle control-equipped vehicles.

BACKGROUND ART

Electronic airflow control systems, such as variable cam timing systems and electronic throttle control systems, replace traditional mechanical throttle cable systems with an "electronic linkage" provided by sensors and actuators in communication with an electronic controller. This increases the control authority of the electronic controller and allows the airflow and/or fuel flow to be controlled independently of the accelerator pedal position.

To control the actual output engine brake torque to achieve the driver-demanded wheel torque, it is desirable to calculate a corresponding desired engine torque. The desired engine torque is then mapped into a desired airflow and fuel flow. The desired airflow can be affected by the air-fuel ratio, phase angle of a variable cam timing (VCT) actuator, and/or percent of exhaust gas recirculation (EGR). Degradation or drifting on any air sensing or control device such as the throttle actuator, throttle position sensor, mass airflow (MAF) sensor, intake manifold pressure (MAP) sensor, VCT sensor, EGR flow sensor, or universal exhaust gas oxygen (UEGO) sensor.

In general, the task of any powertrain monitoring system is to determine if the actual wheel torque is different than that demanded by the driver and may reduce the difference with the electronic throttle, fuel injectors, or spark timing.

With conventional approaches to mapping the desired engine torque to a desired airflow, sensitivity to different components depends largely upon the method of mapping the driver's request into the actual mass airflow through the throttle.

Accordingly, there is a need for an improved powertrain output monitor having a reduced sensor set.

SUMMARY OF THE INVENTION

It is an object of the present invention to provide a system and method for engine torque control in an engine having electronically controlled airflow and/or fuel flow.

Another object of the present invention is to provide a system and method for engine torque control having improved accuracy of generating driver demanded torque. Another object is to reduce the sensor set relied upon by the engine monitor system.

The foregoing and other objects, advantages, and features of the present invention are provided by a method of controlling the power output of an engine having at least one fuel injector responsive to a commanded fuel signal. The method includes the steps of determining a desired engine power, and determining a first fuel flow value as a function of the desired engine power and engine speed. This first fuel flow value is then compared to the desired fuel flow signal generated by the air-fuel ratio controller. The commanded fuel signal is then limited by the lesser of the desired fuel flow and first fuel flow value. In one aspect of the invention, the desired engine power is calculated by determining a first power value as a function of engine speed and a desired engine torque, and determining a second power value as a function of turbine speed, driveline efficiency and a desired wheel power. The desired engine power is then selected as the lesser of the first and second power values. In another aspect of the invention, the first fuel flow value is modulated by static and dynamic tolerance margins to prevent fuel limiting during normal engine operation.

The present invention provides a number of other advantages over prior art powertrain output monitoring strategies. The system is inherently simple because of its reduced sensor set which improves robustness and has advantages for implementation.

BEST MODE(S) FOR CARRYING OUT THE INVENTION

Figure 1:
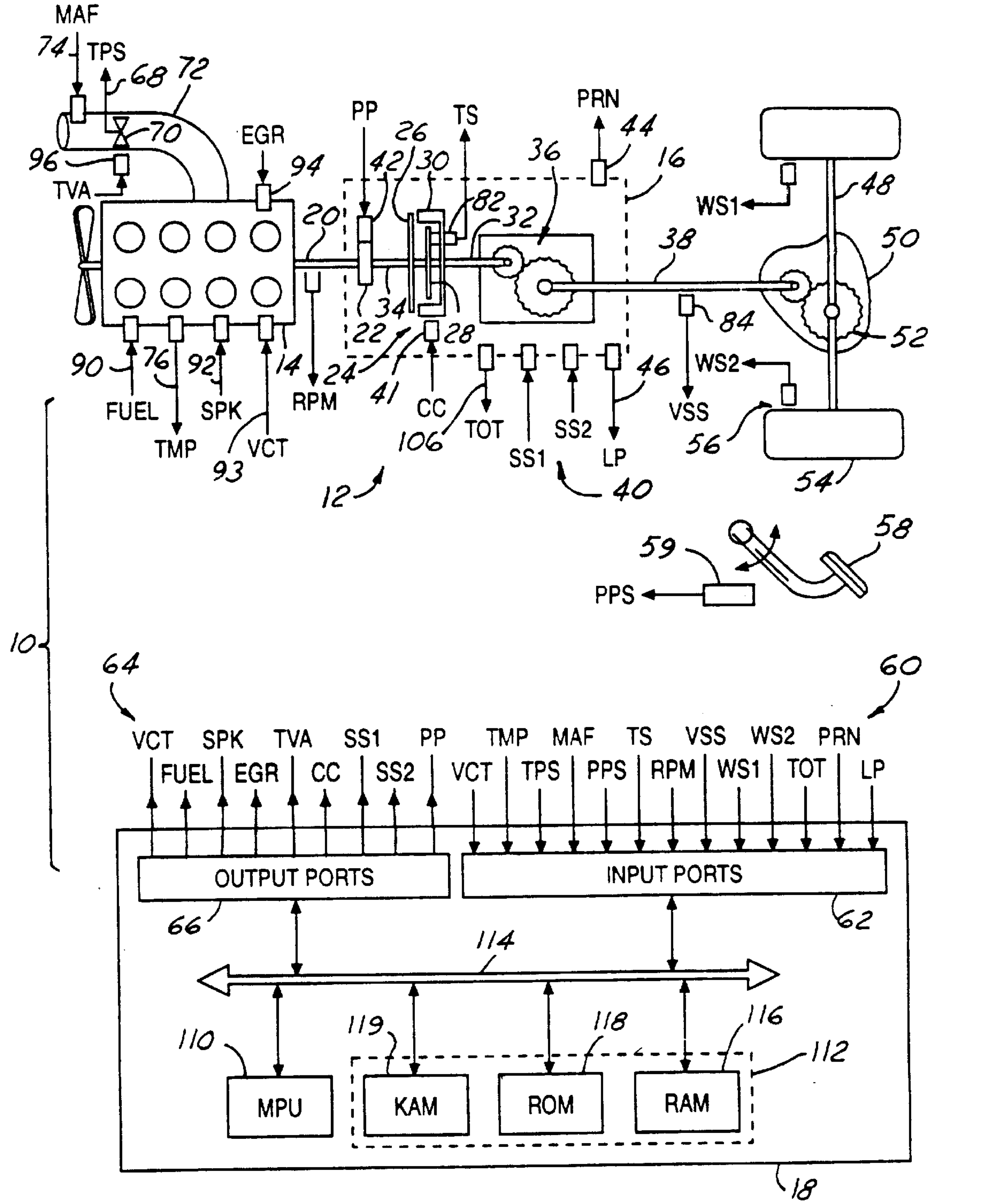
FIG. 1 is a block diagram illustrating a system and method for controlling engine torque according to one embodiment of the present invention.

FIG. 1 provides a block diagram illustrating operation of a system or method for controlling engine torque according to the present invention.

System 10 includes a vehicular powertrain 12 having an internal combustion engine 14 coupled to an automatic transmission 16. Powertrain 12 may also include a controller 18 in communication with engine 14 and transmission 16 for providing various information and control functions. Engine 14 is connected to transmission 16 via crankshaft 20 which is connected to transmission pump 22 and/or torque converter 24. Preferably, torque converter 24 is a hydrodynamic torque converter including a pump or impeller 26 which is selectively fluidly coupled to a turbine 28. Torque converter 24 may also include a frictional converter clutch or bypass clutch 30 which provides a selective frictional coupling between turbine shaft 32 and input shaft 34.

Automatic transmission 16 includes a plurality of input-to-output ratios or gear ratios effected by various gears, indicated generally by reference numeral 36, and associated frictional elements such as clutches, bands, and the like, as well-known in the art. Gears 36 provide selective reduction or multiplication ratios between turbine shaft 32 and output shaft 38. Automatic transmission 16 is preferably electronically controlled via one or more shift solenoids, indicated generally be reference numeral 40, and a converter clutch control (CC) 41 to select an appropriate gear ratio based on current operating conditions. Transmission 16 also preferably includes an actuator for controlling pump pressure (PP) 42 (or line pressure), in addition to a shift lever position sensor (PRN) 44 to provide an indication of the operator's selected gear or driving mode, such as drive, reverse, park, etc. A line pressure sensor (LP) 46 can be provided to facilitate closed loop feedback control of the hydraulic line pressure during shifting or ration changing.

Depending upon the particular application, output shaft 38 may be coupled to one or more axles 48 via a final drive reduction or differential 50 which may include one or more gears, as indicated generally by reference numeral 52. Each axle 48 may include two or more wheels 54 having corresponding wheel speed sensors 56.

In addition to the sensors described above, powertrain 12 preferably includes a plurality of sensors, indicated generally by reference numeral 60, in communication with corresponding input ports 62 of controller 18 to sense or monitor the current operating and ambient conditions of powertrain 12. A plurality of actuators, indicated generally by reference numeral 64, communicate with controller 18 via output ports 66 to effect control of powertrain 12 in response to commands generated by controller 18.

The sensors preferably include a throttle valve position sensor (TPS) 68 which monitors the position of throttle valve 70 which is disposed within intake 72. A mass airflow sensor (MAF) 74 provides an indication of the air mass flowing through intake 72. A temperature sensor (TMP) 76 provides an indication of the engine temperature which may include engine coolant temperature or engine oil temperature, for example.

As also illustrated in FIG. 1, an engine speed sensor (RPM) 80 monitors rotational speed of crankshaft 20. Similarly, a turbine speed sensor 82 monitors the rotational speed of the turbine 28 of torque converter 24. Another rotational speed sensor, vehicle speed sensor (VSS) 84, provides an indication of the speed of output shaft 38 which may be used to determine the vehicle speed based on the ratio of differential 50 and the size of wheels 54. Of course, wheel speed sensors (WS1 and WS2) 56 may be used to provide an indication of the vehicle speed as well.

Depending upon the particular application requirements, various sensors may be omitted or alternative sensors provided which generate signals indicative of related sensed parameters. Values corresponding to ambient or operating conditions may be inferred or calculated using one or more of the sensed parameters without departing from the spirit or scope of the present invention.

An accelerator pedal 58 is manipulated by the driver to control the output of powertrain 12. A pedal position sensor 59 provides an indication of the position of accelerator pedal 58, preferably in the form of counts. In one embodiment, an increasing number of counts indicates a request for increased power output. Preferably, redundant position sensors are used. A manifold absolute pressure (MAP) sensor, or equivalent, may be used to provide an indication of the current barometric pressure.

Actuators 64 are used to provide control signals or to effect movement of various devices in powertrain 12. Actuators 64 may include actuators for timing. and metering fuel (FUEL) 90, controlling ignition angle or timing (SPK) 92, controlling intake/exhaust valve actuators 93 to implement variable cam timing (VCT), setting the amount of exhaust gas recirculation (EGR) 94, and adjusting the intake air using throttle valve 70 with an appropriate servomotor or actuator (TVA) 96. As described above, automatic transmission 16 may be selectively controlled by controlling transmission pump or line pressure using an appropriate actuator (PP) 42 in combination with shift solenoids (SS1 and SS2) 40 which are used to select an appropriate gear ratio, and a converter clutch actuator or solenoid (CC) 41 used to lock, unlock or control slip of the torque converter clutch 30. Also preferably, a temperature sensor 106 is provided to determine the transmission oil temperature (TOT).

Controller 18 is preferably a microprocessor-based controller which provides integrated control of engine 14 and transmission 16 of powertrain 12. Of course, the present invention may be implemented in a separate controller depending upon the particular application. Controller 18 includes a microprocessor 110 in communication with input ports 62, output ports 66, and computer readable media 112 via a data/control bus 114. Computer readable media 112 may include various types of volatile and nonvolatile memory such as random access memory (RAM) 116, read-only memory (ROM) 118, and keep-alive memory (KAM) 119. These "functional" descriptions of the various types of volatile and nonvolatile storage may be implemented by any of a number of known physical devices including but not limited to EPROMs, EEPROMs, PROMs, flash memory, and the like. Computer readable media 112 include stored data representing instructions executable by microprocessor 110 to implement the method for controlling engine torque according to the present invention.

Figure 2:
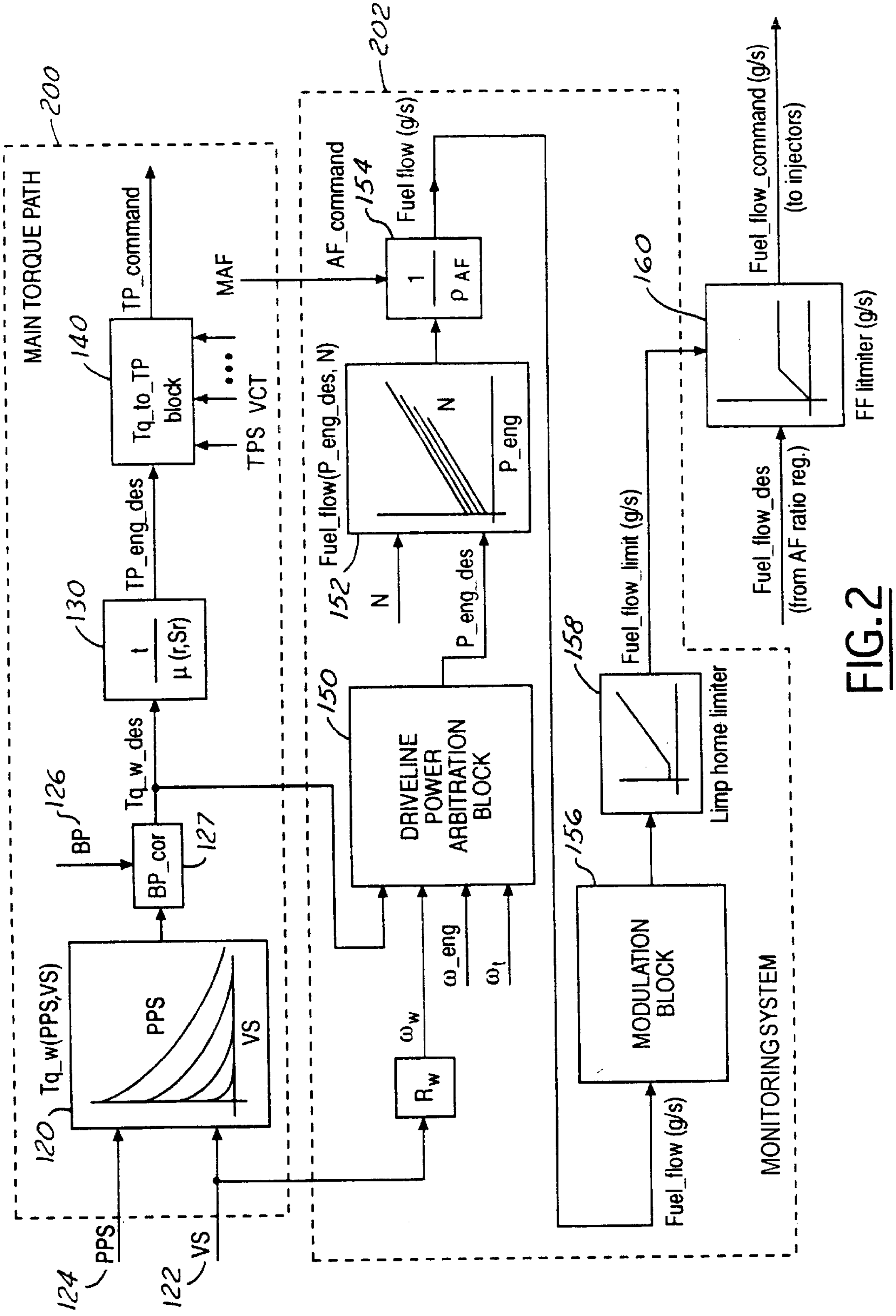
FIG. 2 is a block diagram illustrating an output torque based powertrain control strategy including a powertrain output monitoring system according to one embodiment of the present invention.

FIG. 2 shows one embodiment of the powertrain output monitor of the present invention implemented in a torque-based engine strategy. The primary torque control scheme is represented in block 200 and the powertrain output monitor scheme is represented in block 202. The torque-based strategy is configured to determine a desired cylinder airflow based on the driver's torque request as measured by the pedal position and a number of other engine and vehicle variables. The ETC actuator is then controlled to deliver the desired airflow using the throttle position and/or MAP or MAF sensor signals. Fuel injectors are operated by known methods to regulate the air-fuel ratio to a desired value. Because the main path of the torque-based strategy follows from driver's request to desired cylinder airflow to throttle position, it was decided to use fuel as an independent actuator to provide fault protection relating to driver-demanded torque. However, it is important that the fuel-based fault protection is designed such that it does not interfere with air-fuel ratio regulation when the overall system is error free.

Referring to block 200, a driver demand is interpreted as represented by block 120 of FIG. 2 based on the vehicle speed 122, accelerator pedal position 124, and barometric pressure 126 corrected by a correction factor 127. These values are used to determine a desired wheel torque (Tq_w_des). The Tq_w(PPS,VS) map 120 is derived by known engine mapping methods and dictates how the driver pedal position is interpreted by the system.

In the implementation shown, the desired wheel torque is transformed to the engine side by dividing it at block 130 with the driveline (torque converter, transmission gear ratio, final drive gear ratio) multiplication factor to obtain the desired engine torque (Tq_eng_des). This value is then converted by known methods at block 140 into a throttle opening command (TP_command) and air-fuel ratio command (AF_command) including a desired fuel flow (Fuel_flow_des).

While the main torque path 200 is described with reference to a system based on desired wheel torque, the present invention is independent of the particular strategy used to determine the desired engine brake torque. For example, the present invention could be easily applied to a system which uses a desired tractive effort or wheel power to determine a desired engine brake torque. Likewise, the present invention is applicable to systems which determine a desired engine brake torque directly from the operator via an accelerator pedal or similar device.

The fuel-based monitor system 202 begins with a determination of the torque or power transfer through the torque converter and transmission. This task is performed by the driveline power arbitration block 150, which will be discussed in further detail with reference to FIG. 3. The arbitration block 150 computes the desired engine power (P__eng__des) which represents the lesser of two engine power quantities calculated by different methods.

It has been determined experimentally that there exists an approximately linear behavior of fuel flow versus engine power while operating at stoichiometric air/fuel ratio, and weak dependence on other variables such as VCT or EGR. The present system takes advantage of this weak dependence by specifying baseline engine operating parameters and determining fuel flow as a function of P__eng__des and engine speed (N) in lookup table 152. Under ideal conditions, the signal (Fuel__flow) generated by the lookup table can be used to operate the fuel injectors to provide a wheel torque equal to that requested by the driver. For several reasons, however, this fuel signal may not be appropriate to maintain the desired air-fuel ratio which is a high priority task for the engine control system. For example, if the engine runs lean or if the VCT is retarded from base timing, improved engine efficiency results in less fuel being injected for a given engine power. Conversely, if the air-fuel ratio is rich, the additional fuel is not burned and does not increase the power output.

A correction factor, represented by block 154, is therefore used if the engine is operated with a rich air-fuel ratio. The resulting Fuel__flow signal is then communicated to the modulation block 156.

Modulation block 156 functions to mitigate the transient affects such as the intake manifold filling and emptying, and effectively increases the fuel limit. Modulation block 156 will be discussed in further detail below with reference to FIG. 4.

The modulated Fuel__flow is then lower-limited at block 158 to prevent it from being active at the very low power levels such as idle, and to allow "limp home" capability when desired. The output of the limp home limiter is equal to its input above a desired threshold, and equal to the threshold when below. The resulting signal, Fuel__flow__limit, in mass of fuel per second, is used to limit the fuel injected into the ports or cylinders of the engine. The fuel flow limiter in block 160 then operates to limit Fuel__flow__des, the fuel mass flow rate obtained from the air-fuel ratio regulation system such that the injected fuel mass flow rate (Fuel__flow__command) does not exceed Fuel__flow__limit.

Fuel__flow__des, the desired fuel mass flow rate, is obtained by the air/fuel ratio regulator subsystem which maintains the desired air/fuel ratio by matching estimated cylinder air charge with an appropriate amount of fuel. In addition, feedback from an HEGO or UEGO is typically used to determine the value of Fuel__flow__des as is known in the art. The signal, in turn, is modified to generate Fuel__flow__command. The signal Fuel__flow__command is then transmitted to the injectors to control the mass of fuel per second injected into the engine ports or cylinders. Of course, the Fuel__flow__limit can alternatively be expressed in mass per stroke units as Fuel__injected__per__stroke equals Fuel__flow times 120/($Nn_{cyl}$) and fuel limiting may be performed in these units.

Figure 3:
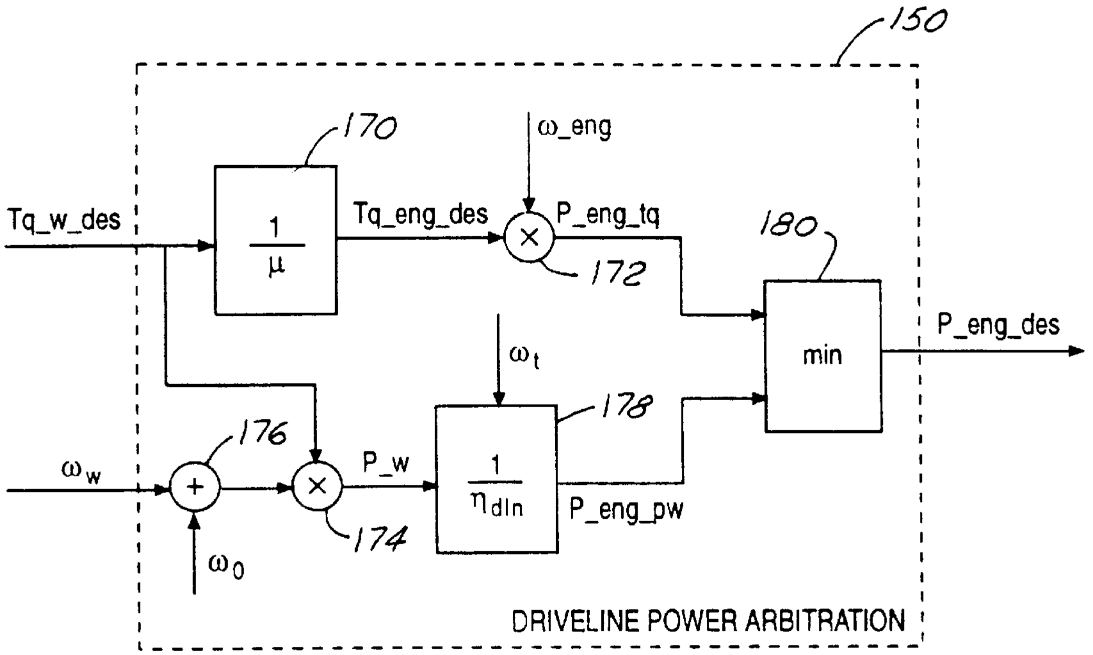
FIG. 3 is a block diagram of the driveline power arbitration block of FIG. 2.

The driveline power arbitration block 150 will now be described in greater detail with reference to FIG. 3. Driveline power arbitration block 150 derives the desired engine power (P__eng__pw) which represents the lesser value of the engine power computed by two different methods. This is to ensure that potential sensor degradation or drifting will not result in inaccuracies in the Fuel__flow__limit and, hence the engine power output. The first, upper path of FIG. 3 is similar to the main torque path 200 of FIG. 2. The upper path provides a torque-based desired engine power (P__eng__tq). This is accomplished by transforming the desired wheel torque (Tq__des) to the engine side by dividing it with the driveline multiplication factor at block 170 to obtain the desired engine torque (Tq__eng__des). The torque-based desired engine power is then obtained as the product of the desired engine torque and the current value of the engine speed (ω__eng=N2π/60) at 172.

The lower path computes a "power-based" value of the desired engine power (P__eng__pw). The product (block 174 ) of the current value of the wheel speed ($w_w$) and the desired wheel torque results in a desired wheel power ($P_w$). At very low vehicle speeds, i.e., below 5 mph, the vehicle speed requires special considerations because the desired engine power is at or near 0.0. For this reason, a small offset ($w_o$) is added at 176 to the angular wheel velocity ($w_w$) which will be later removed at block 178 as described below.

The desired wheel power ($P_w$) is then divided by a value representing the efficiency of the driveline, i.e., the torque converter and the transmission, ($n_{dln}$) resulting in a desired engine power (P__eng__pw). The driveline efficiency factor depends on the speed ratio across the torque converter ($S_r$), the transmission gear, and whether or not the converter is locked-up. If the speed ratio dependent torque multiplication factor is denoted by Tq__mult($S_r$) and the gear ratio by R(gear), the desired engine torque is then computed as:

$$\text{Tq\_eng\_des} = \frac{1}{\mu(r, S_r)}\text{Tq\_w\_des} \tag{1}$$

where $\mu(r,S_r)$=r(gear)tq__mult($S_r$)n(gear), with n(gear) being a gear dependent efficiency of the transmission. If it is assumed that the main torque path is not compensated for losses in the transmission, n(gear) will equal 1.0, otherwise it may also be compensated for in the driveline efficiency factor. To make the upper path and lower path comparable, the driveline efficiency factor is defined as follows:

$$n_{dln}=((w_t+rw_o/w\_eng)tq\_\text{mult}(S_r)=(S_r+(rw_o/w\_eng))tq\_\text{mult}(S_r) \tag{2}$$

where W__eng is the engine speed in rad/sec and $w_t$ is the measured turbine speed which, when the transmission is in gear, is equal to $w_w \times r$(gear).

At this point, a value of desired engine power has been determined for each of the upper and lower paths, specifically, P__eng__tq and P__eng__pw. These values are then compared at block 180 and the smaller of the two values is then used as the value for P__eng__des for the fuel limiting computations to follow. Under normal operating conditions, these two values are very close or identical. However, if the vehicle speed or turbine speed sensor degrades or drifts, the two variables will behave differently, moving in opposite directions from the nominal value. Thus, by using the smaller of the two values as the value of the desired engine power for the fuel limiter, the system assures that sensor degradation or drifting will not result in an inaccurate fueling rate and, possibly, inaccurate engine power output.

The operation of the modulation block 156 will now be described with reference to FIG. 4. The purpose of the modulation block is to prevent an activation of the fuel limiter during normal operation resulting from transients or small uncertainties. Because of these conditions, the fuel limiter is set at a value somewhat higher than the fuel flow value determined in the lookup table map 152 of FIG. 2. Compensation is required because uncertainties may be larger during transients than in steady state, particularly since fuel limit data will typically be based on steady state data. In addition, transient conditions require an additional correction because the response of the engine cannot be instantaneous. For example, a driver tip-out is interpreted as an instantaneous reduction in the requested power. However, the actual reduction in power output of the engine must follow a less steep decline determined by the time constant of emptying the intake manifold. Hence, the system prevents an instantaneous drop of the fuel limit and forces it to follow a more gradual decline. Similarly, on tip-ins, the system provides an additional margin to accommodate transient air-fuel ratio control and possible downshifts.

Figure 4:
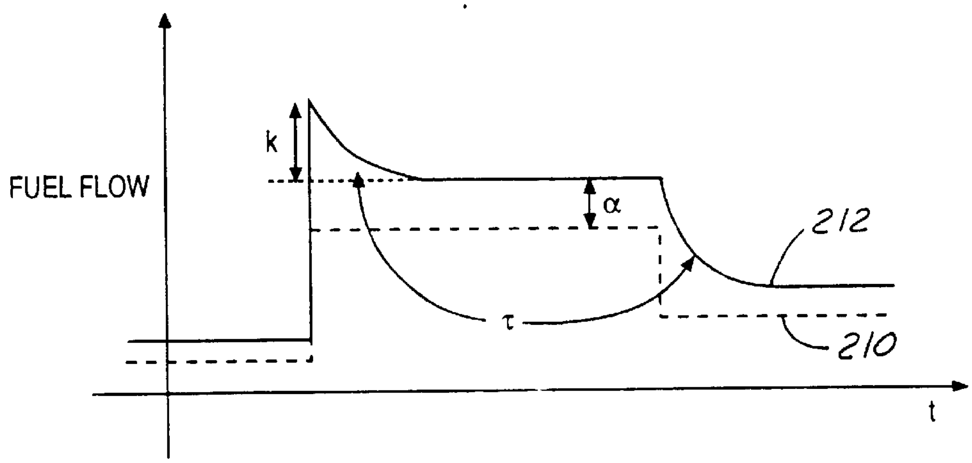
FIG. 4 is a block diagram of the modulation block of FIG. 2.

FIG. 4 represents a graphical representation of the input and output behavior of the modulation block 156. The input signal Fuel_flow is represented in the graph as dashed line 210. The output of the modulation block is shown as solid line 212. During steady state operation, the output of the modulation block exceeds the input by a factor of $1+\alpha$, where $\alpha$ is the static fault tolerance margin having a typical range of 0.1 to 0.3. In other words, in steady state, the fuel flow is allowed to exceed the ideal value Fuel_flow(P_eng_des,N) by approximately 10% to 30%. During transient conditions, the output of the modulation block exceeds the input by an additional amount which is determined by a simple filter having a time constant T and a gain k, referred to as the dynamic fault tolerance margin. Typical values of k range from approximately 0.0 to 1.0 and for T from approximately 0.1 s to 0.4 s.

Values for the headroom margins $\alpha$ and k in the modulation block 156 can be established by defining a relationship between the fuel flow rate in g/s and the vehicle acceleration in G's, the gravity acceleration. In this example, the maximum allowed acceleration due to a potential failure as $\Delta a_G$ as expressed in G's. For the purpose of the fault protection system, only the transient limit ($\Delta a_G$) need be considered because the change in the fueling rate does not have an effect on the steady state value of the acceleration since an increased engine torque is matched by an increase in road load and friction at the higher vehicle and engine speeds. The relationship between the fuel flow rate and the vehicle acceleration can be defined as follows:

$$a_G = M_s \text{ fuel\_flow} - M_o \quad (3)$$

$$M_s = (R_w\, \mu(r,S_r))/(G\, J_v\, w\_\text{eng}\, \beta \quad (4)$$

$R_w$ represents the radius of the wheels, $\mu(r,S_r)$ is as defined as in equation (1), $G=9.81\ m/s^2$, $J_v$ is the equivalent moment of inertia of the vehicle, and $\beta_1$ is the slope of the lines relating engine power and fuel mass flow rate as shown in block 152 of FIG. 2. The value of $M_s$ is the quantity that determines the effect of fuel flow increase on vehicle acceleration. The lower $M_s$ is, the larger the quantity of fuel that can be injected without crossing the threshold of, in this case, $\Delta a_G$. In absolute numbers, $M_s$ is the largest in first gear, at low engine speeds, when the vehicle is standing still. The fuel quantity equal to $\Delta a_G/M_s$, which is a function of engine speed, is defined as the critical fuel flow increment denoted by the variable ff_crit(N). It is then compared with the largest possible fuel flow rate at stoichiometric air-fuel ratio. This variable is denoted by ff_max(N). The ratio is defined as follows:

$$ff\_\text{ratio}(N) = ff\_\text{crit}(N)/(ff\_\text{max}(N) - ff\_\text{crit}(N)) \quad (5)$$

The value of the ratio determines the value for the margin $\alpha$ or $\alpha+k$, in the modulator block 156, such that under worst case conditions, fuel flow rate increase to Fuel_flow limit does not cause an increase in acceleration above the desired value, i.e., $\Delta a_G$.

Figure 5:
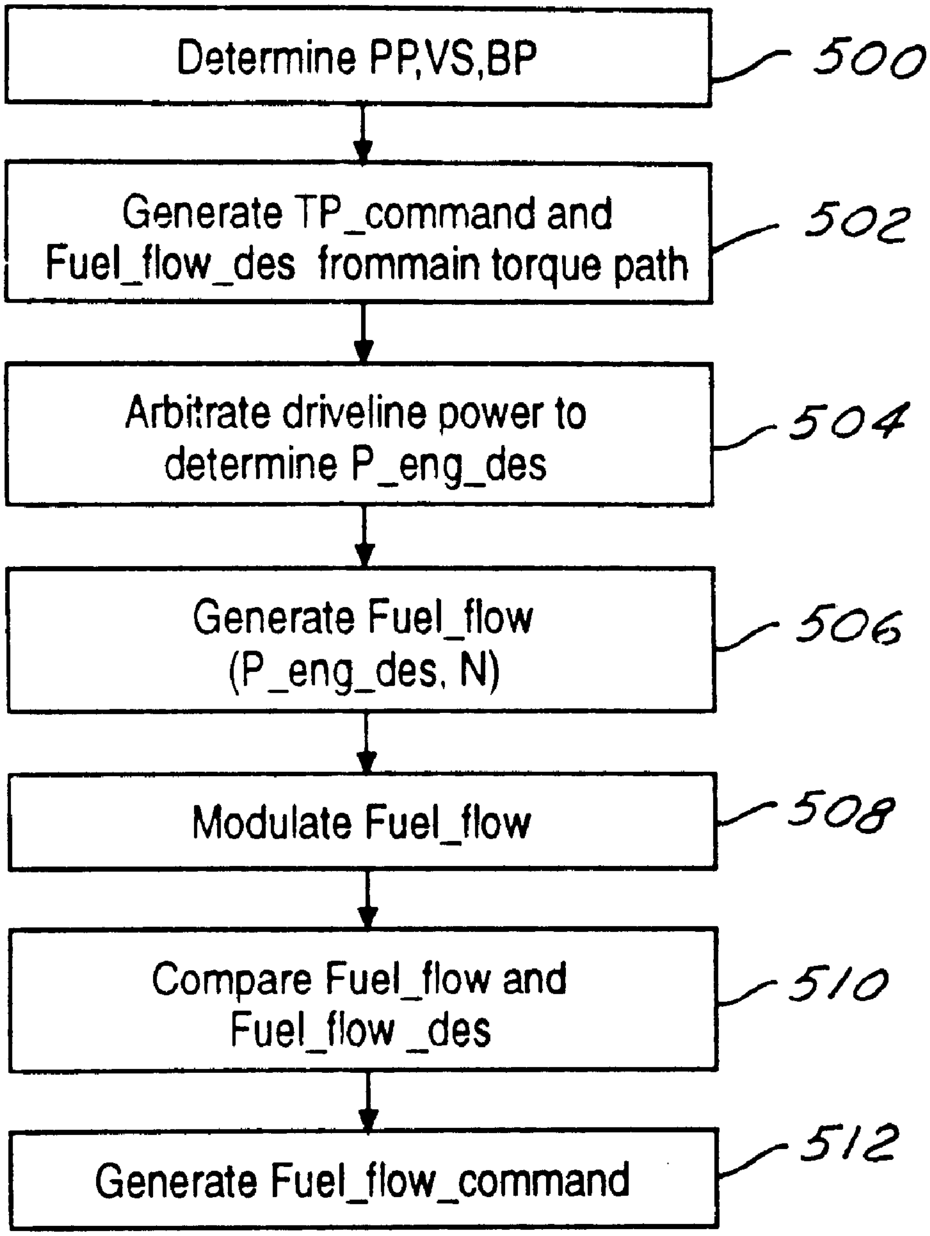
FIG. 5 is a flowchart illustrating a method for controlling engine torque according to the powertrain output monitor of the present invention.

FIG. 5 is a flowchart describing the operation of the powertrain output monitoring scheme of the present invention. In step 500, the main torque path receives inputs indicating the vehicle speed, pedal position and barometric pressure. From these values, the main torque path generates, in step 502, a throttle position command (TP_command) and air-fuel ratio command including a desired fuel flow (Fuel_flow_des) by known methods. In step 504, the powertrain output monitor generates a desired engine power (P_eng_des) by arbitrating between a "torque-based" engine power quantity and "power-based" engine power quantity. The lesser of these two values is selected as the desired engine power. By calculating the desired engine power this way, the system insures that potential sensor degradation or drifting will not result in accurate fuel flow. The resulting fuel flow (Fuel_flow) is then determined as a function the engine speed and desired engine power in step 506. This fuel flow value is then modulated by the static and dynamic fault tolerance margins in step 508 to prevent fuel limiting during normal engine operation. The value of Fuel_flow is then used to limit the fuel flow to the injectors in steps 510 and 512 by setting the commanded fuel flow (Fuel_flow_command) to the lesser of the desired fuel flow and generated fuel flow. The quantity determined by Fuel_flow_command is used to determine the injection timing for the fuel injectors.

From the foregoing, it can been seen that the system provides real-time monitoring by limiting the fuel delivered to the engine in a pro-active manner. For example, if the throttle valve is stuck open or a faulty MAF or UEGO sensor exists, it may result in a large cylinder air charge signal which in turn leads to a large fuel flow request. Such a condition should activate the fuel flow limiter as discussed above. In such a case, besides limiting the amount of fuel delivered to the engine, the system can also provide a warning. For example, a logical flag can be set if the fuel limiter is active at a given time instant and cleared if it is not. The logic variable for a given time instant (i) is defined as follows:

$$fl\_\text{active}(i) = 0 \text{ if Fuel\_flow\_des}(i) < \text{Fuel\_flow\_limit}(i) \quad (6)$$

$$fl\_\text{active}(i) = 1 \text{ if Fuel\_flow\_des}(i) > \text{Fuel\_flow\_limit}(i) \quad (7)$$

A flag can then be activated based on the status of the logic variables and equations (6) and (7) as follows:

$$\text{flag} = 1 \text{ if } \frac{1}{m}\sum_{i-m}^{i} \text{fl\_active}(i) > (1/2) \quad (8)$$

where m is the time-window for detection. The flag can then be used to activate an indicator light in the operator cockpit of the vehicle and/or alert an on-board diagnostic system. Note, however, that the monitor system operates independently of the fuel limiting system described above.

From the foregoing, it will be seen that there has been brought to the art a new and improved powertrain output monitor which has advantages over conventional fault detection systems. While the invention has been described in connection with one or more embodiments, it will be understood that the invention is not limited to those embodiments. On the contrary, the invention covers all alternatives, modifications and equivalents as may be included within the spirit and scope of the appended claims.

What is claimed is:

1. A method for controlling an engine having at least one fuel injector responsive to a commanded fuel signal, the method comprising:

determining a desired engine power by determining a first power value as a function of engine speed and a desired engine torque, determining a second power value as a function of turbine speed, driveline efficiency and a desired wheel power, and setting said desired engine power to the lesser of said first and second power values;

determining a first fuel flow value as a function of the desired engine power and engine speed; and limiting the commanded fuel signal based on said first fuel flow value.

2. The method of claim 1 further comprising modulating the first fuel flow value to prevent fuel limiting during normal engine operation.

3. A method for controlling an engine having at least one fuel injector responsive to a commanded fuel signal, the method comprising:

determining a desired engine power;

determining a first fuel flow value as a function of the desired engine power and engine speed;

limiting the commanded fuel signal based on said fuel flow value;

modulating the first fuel flow value to prevent fuel limiting during normal engine operation; and providing a static tolerance margin to said first fuel flow value, and providing a dynamic tolerance margin to said first fuel flow value.

4. The method of claim 1 further comprising correcting the first fuel flow value during rich air-fuel operation of the engine.

5. The method of claim 1 wherein limiting the commanded fuel signal based on said first fuel flow value comprises setting the commanded fuel flow signal to the lesser of a desired fuel flow value and said first fuel flow value.

6. The method of claim 5 further comprising setting a flag when the commanded fuel signal is set to the first fuel flow value.

7. In an internal combustion engine having at least one fuel injector responsive to a commanded fuel signal and an engine controller responsive to an accelerator pedal position input for generating a throttle position command and a first fuel flow value, a method of regulating the powertrain output comprising:

determining a desired engine power by determining a first power value as a function of engine speed and a desired engine torque, determining a second power value as a function of turbine speed, driveline efficiency and a desired wheel power, and setting said desired engine power to the lesser of said first and second power values;

determining a second fuel flow value as a function of the desired engine power and engine speed;

modulating the second fuel flow value to prevent fuel limiting during normal engine operation; and generating the commanded fuel signal as a function of the first fuel flow value and modulated second fuel flow value.

8. The method of claim 7 further comprising correcting the second fuel flow value during rich air-fuel operation of the engine.

9. The method of claim 7 wherein modulating the second fuel flow value includes providing a static tolerance margin to said second fuel flow value, and providing a dynamic tolerance margin to said second fuel flow value.

10. The method of claim 7 wherein generating the commanded fuel signal as a function of the first fuel flow value and modulated second fuel flow value comprises setting the commanded fuel signal to the lesser of the first fuel flow value and modulated second fuel flow value.

11. The method of claim 10 further comprising setting a flag when the commanded fuel signal is set to the modulated second fuel flow value.

12. A control system for an internal combustion engine responsive to an accelerator pedal position input, said engine including at least one fuel injector responsive to a commanded fuel signal, and a throttle responsive to a throttle position command signal, the controller comprising:

an accelerator pedal position sensor for providing an accelerator pedal position value;

a vehicle speed sensor for providing a vehicle speed value;

a control unit including a microprocessor for receiving the accelerator pedal position value and vehicle speed value, the microprocessor programmed to perform the following steps:

generate said throttle position command and a first fuel flow value as a function of said accelerator pedal position value and vehicle speed value;

determine a desired engine power by determining a first power value as a function of engine speed and a desired engine torque, determining a second power value as a function of turbine speed, driveline efficiency and a desired wheel power, and setting said desired engine power to the lesser of said first and second power values;

determine a second fuel flow value as a function of the desired engine power and engine speed; and limit said commanded fuel signal as a function of said first and second fuel flow values.

13. A control system for an internal combustion engine responsive to an accelerator pedal position input, said engine including at least one fuel injector responsive to a commanded fuel signal, and a throttle responsive to a throttle position command signal, the controller comprising:

an accelerator pedal position sensor for providing an accelerator pedal position value;

a vehicle speed sensor for providing a vehicle speed value;

a control unit including a microprocessor for receiving the accelerator pedal position value and vehicle speed value, the microprocessor programmed to perform the following steps:

generate said throttle position command and a first fuel flow value as a function of said accelerator pedal position value and vehicle speed value;

determine a desired engine power;

determine a second fuel flow value as a function of the desired engine power and engine speed;

limit said commanded fuel signal as a function of said first and second fuel flow values; and modulate the second fuel flow value by providing a static tolerance margin to said second fuel flow value, and providing a dynamic tolerance margin to said second fuel flow value.

14. The control system of claim 12 wherein the microprocessor is programmed to generate the commanded fuel signal by setting the commanded fuel signal to the lesser of the first fuel flow value and second fuel flow value.

15. The control system of claim 14 wherein the microprocessor is further programmed to set a flag when the commanded fuel signal is set to the second fuel flow value.

* * * * *